United States Patent
Fang

(10) Patent No.: US 11,315,237 B2
(45) Date of Patent: Apr. 26, 2022

(54) EBEAM INSPECTION METHOD

(71) Applicant: Hermes Microvision, Inc., Hisnchu (TW)

(72) Inventor: Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 243 days.

(21) Appl. No.: 14/952,067

(22) Filed: Nov. 25, 2015

(65) Prior Publication Data

US 2016/0314572 A1    Oct. 27, 2016

Related U.S. Application Data

(60) Provisional application No. 62/055,066, filed on Sep. 25, 2014.

(51) Int. Cl.
  *G06T 7/00* (2017.01)
  *G06T 7/30* (2017.01)
  *G01N 23/2251* (2018.01)

(52) U.S. Cl.
  CPC ......... *G06T 7/001* (2013.01); *G01N 23/2251* (2013.01); *G06T 7/30* (2017.01); *G01N 2223/401* (2013.01); *G01N 2223/418* (2013.01); *G01N 2223/6116* (2013.01); *G01N 2223/6466* (2013.01); *G06T 2207/10061* (2013.01); *G06T 2207/30148* (2013.01)

(58) Field of Classification Search
  CPC .................. H01J 2237/2817; G06T 7/001
  See application file for complete search history.

(56) References Cited

U.S. PATENT DOCUMENTS

| | | | |
|---|---|---|---|
| 2007/0288219 A1* | 12/2007 | Zafar | G03F 1/84 703/14 |
| 2009/0290783 A1* | 11/2009 | Sakai | G01N 21/9501 382/149 |
| 2010/0158317 A1* | 6/2010 | Fang | G06K 9/627 382/106 |

* cited by examiner

*Primary Examiner* — Vincent Rudolph
*Assistant Examiner* — Raphael Schwartz
(74) *Attorney, Agent, or Firm* — Finnegan, Henderson, Farabow, Garrett & Dunner, LLP

(57) ABSTRACT

An image is obtained by using a charged particle beam, and a design layout information is generated to select patterns of interest. Grey levels among patterns can be compared with each other to identify abnormal, or grey levels within one pattern can be compared to a determined threshold grey level to identify abnormal.

6 Claims, 6 Drawing Sheets

EBEAM INSPECTION METHOD

CLAIM OF PRIORITY

This application claims the benefit of priority of [U.S. provisional application No. 62/055,066 entitled to inventors filed on Sep. 25, 2014 and entitled "VC Detection on GDS", the entire disclosures of which are incorporated herein by reference.

FIELD OF THE INVENTION

The invention relates to a defect inspection method. The invention also relates to an inspection method including design layout information to identify defects with high throughput. However, it would be recognized that the invention has a much broader range of applicability.

BACKGROUND OF THE INVENTION

In the semiconductor manufacturing processes, many kinds of defects are inevitably incurred, such as uninvited particles, contaminations, pattern distortions in lithography, open or short circuit, which the last kind of defects relates to an electric defect. The electric defect, which is fatal to cause an electronic device failure, can be identified by charged particle beam only.

Present electric defects are inspected commercially by using ebeam (electron beam) with large beam current (about several nA to pA) scanning on an electronic device. When open/short circuits are present to the electronic device, abnormal charges, either positive or negative, will be accumulated on surface of an electronic device to generate VC (voltage contrast) thereon when the ebeam scans, so it affects the secondary electrons emanated from the surface of the electronic device into the detector. Hence, the grey level of obtained image on the abnormal regions will be different from that of the normal regions. Such kind of electric defects are also refers as VC defect.

VC defect inspection for semiconductor manufacture is easy and fast compared to other kinds of defect inspection, because of large beam current. If the beam current is not large enough, not enough accumulated charged can be obtained and there will be no VC generated. For some other apparatus of ebeam tool based on SEM (Scanning Electron Microscope), such as review SEM or CD (Critical Dimension) SEM, the beam current operated are at several pA to nA, because aberration will be incurred in large beam current.

In the present art, VC defects are identified by comparing three images with theoretical identical patterns if there is one region in one image with different pattern. For logic devices, three images of three dice are required for compare, while only one image is necessary for memory devices due to array pattern of the memory device.

However, VC defect inspection is mostly applied for identifying the electric defects, but hard to identify other kinds of defects. In the defect inspection field, the semiconductor manufacturers attempt to inspect other kinds of defects as easy and fast as the VC defect inspection.

For logic circuit, there must be three images from three different dice for VC defect inspection, which is random mode or die-to-die. Here, one image always refers to a region of one die, and two images refer to the same location of a region in two dice. However, for ebeam tool operation, conditions of the three images may be a little different because the accumulated charges on the three dice can't be controlled very accurately. To identify grey level difference to the three images will be tougher than one image in one die.

For the memory device, although only one image is necessary due to the array pattern, which is array mode or cell-to-cell, defect inside only one pattern is hard to be identified. Although this kind of defect can be identified by using review SEM, but throughput of the review SEM can't be compared to the ebeam inspection tool. The semiconductor manufacturers have long term requirement to identify this defect by using VC defect inspection.

For the VC defect inspection, a defect with several pixels is identified, but a defect with one pixel is hardly to be identified, because the image resolution is low enough to increase inspection throughput. Therefore, the semiconductor manufacturers have strong intentions to identify the defect with one or two pixels in VC defect inspection.

Accordingly, a new, high throughput inspection method for identifying defect with few pixels in one image is needed. Such a method will be more advantageous to improve the issues presented in the prior arts.

BRIEF SUMMARY OF THE INVENTION

The object of this invention is to provide a VC mode inspection method for identifying defect in one pattern or in one image, even to be inspected sample or specimen has logic circuit, when design layout information is included. Finer or pixel-level defect can be identified and process uniformity can be monitored.

Accordingly, the invention provides an inspection method, which comprises steps of scanning a sample by using a charged particle beam to obtain an image, aligning at least one pattern on the image to a design layout information, wherein the at least one pattern is generated according to the design layout information, and determining abnormality of the at least one pattern, by using grey levels of the at least one pattern, according to the design layout information.

The charged particle beam is an electron beam generated by a scanning electron microscope. This inspection method may further comprise a step of determining a threshold grey level for the at least one pattern before the step of determining abnormality. The step of determining abnormality identifies a pixel of the at least one pattern is a defect if a grey level of the pixel is different from the threshold grey level.

The aligning step may include a group of patterns with a similar property to the at least one pattern on the image by using the design layout information. The determining step compares the grey levels of the at least one pattern to each grey levels of the group of patterns. The determining step identifies the at least one pattern is a defect if the grey levels of the at least one pattern are different from the each grey levels of the group of patterns. The defect is a voltage contrast defect.

The invention therefore provides a method for detecting defects, which comprises steps of scanning a sample by using a charged particle beam to obtain an image, aligning the image to a design layout information for generating a single pattern or a group of patterns on the image, and determining abnormality of the single pattern according to the design layout information.

The charged particle beam is an electron beam generated by a scanning electron microscope. The method for detecting defects may further comprise a step of determining a threshold grey level for the at least one pattern before the step of determining abnormality. The step of determining abnormality identifies a pixel of the at least one pattern is a defect if a grey level of the pixel is different from the threshold grey level.

The group of patterns has a similar property to the single pattern by using the design layout information. The determining step compares grey levels of the single pattern to each grey levels of the group of patterns. The determining step identifies the single pattern is a defect if the grey levels of the single pattern are different from the each grey levels of the group of patterns. The defect is a voltage contrast defect.

The invention further provides a method for inspecting a sample, which comprises steps of scanning the sample by using an electron beam to obtain an image, aligning a pattern on the image to a design layout information, wherein the pattern is generated from the design layout information, determining a threshold grey level for the pattern according to the design layout information, and identifying whether a pixel is a defect if a scanned grey level of the pixel is different from the threshold grey level. The design layout information may be GDS.

The invention further provides a method for inspecting a sample, which comprises steps of scanning a sample by using an electron beam to obtain an image, aligning a group of patterns on the image to a design layout information, wherein the group of patterns is generated from the design layout information and has a similar property according to the design layout information, and comparing grey levels of the group of patterns with each other to identify abnormality. The design layout information may be GDS.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
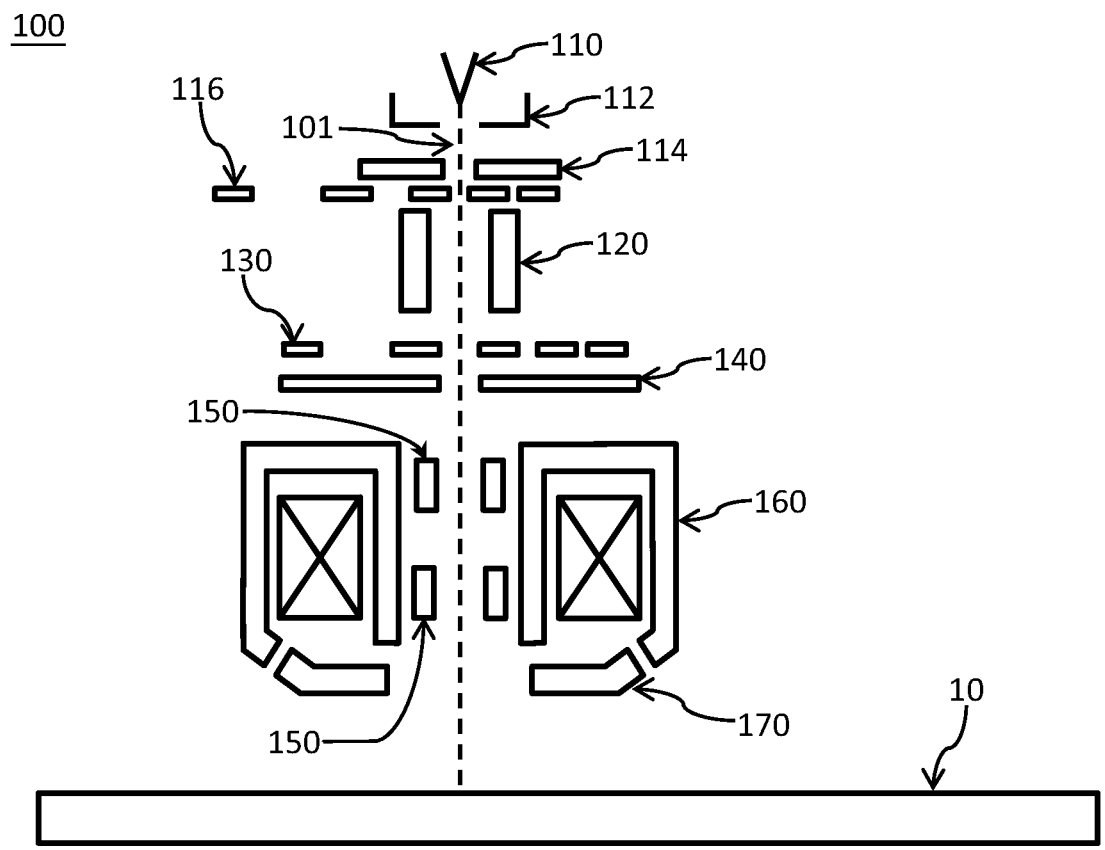
FIG. 1 is a schematic illustration of an electron beam tool for inspecting defect in the present invention.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

As used herein, the term "specimen" generally refers to a wafer or any other specimen on which defects of interest (DOI) may be located. Although the terms "specimen" and "wafer" are used interchangeably herein, it is to be understood that embodiments described herein with respect to a wafer may configured and/or used for any other specimen (e.g., a reticle, mask, or photomask).

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

One or more layers may be formed upon a wafer. Many different types of such layers are known in the art, and the term wafer as used herein is intended to encompass a wafer on which all types of such layers may be formed. One or more layers formed on a wafer may be patterned. For example, a wafer may include a plurality of dice, each having repeatable patterned features. Formation and processing of such layers of material may ultimately result in completed semiconductor devices. As such, a wafer may include a substrate on which not all layers of a complete semiconductor device have been formed or a substrate on which all layers of a complete semiconductor device have been formed.

The wafer may further include at least a portion of an integrated circuit (IC), a thin-film head die, a micro-electromechanical system (MEMS) device, flat panel displays, magnetic heads, magnetic and optical storage media, other components that may include photonics and optoelectronic devices such as lasers, waveguides and other passive components processed on wafers, print heads, and bio-chip devices processed on wafers.

Turning now to the drawings, it is noted that the figures are not drawn to scale. In particular, the scale of some of the elements of the figures is greatly exaggerated to emphasize characteristics of the elements. It is also noted that the figures are not drawn to tie same scale. Elements shown in more than one figure that may be similarly configured have been indicated using the same reference numerals.

Various example embodiments of the present invention will now be described more fully with reference to the accompanying drawings in which some example embodiments of the invention are shown. Without limiting the scope of the protection of the present invention, all the description and drawings of the embodiments will exemplarily be referred to an electron beam. However, the embodiments are not be used to limit the present invention to specific charged particles.

Please refer to FIG. 1, an ebeam tool 100, based on SEM in an embodiment, is provided for defect inspection in this invention, and other charged particle tool may also be applied. The ebeam tool 100 in sequence includes an electron tip 110 for emitting a primary electron beam 101, an anode 112 for extracting electrons from the tip 110, an electrode 114 with one aperture for selecting suitable solid angle electrons in the primary beam 101, a Coulomb plate 116 with several apertures for trimming the primary electron beam 101 to reduce Coulomb effect, a condenser lens 120 for condensing the primary electron beam 101, a plate 130 with several apertures for further trimming the primary beam 10 to control beam current of the primary electron beam 101, a detector 140 for receiving SE (Secondary Electron) and BSE (Backscatter Electron) emanating from the specimen 10, a deflector unit 150 for scanning the primary electron beam 101, an immerse magnetic objective lens 160 for focusing the primary electron beam 101 onto the specimen 10, and an electrode 170 for providing retard force to the primary electron beam 101 such that landing energy of the primary electron beam 101 can be lowered. Pole piece of the objective lens 160, the electrode 170, and the specimen 10 supported by a stage can constitute an electrostatic lens which combined with the magnetic lens to form an EM (Electromagnetic) compound objective lens.

Other ebeam tools also based on SEM, such as review SEM for review defect and CD SEM for metrology, are not designed for inspection purpose. The inspection requires high throughput to identify defects, while the review requires high resolution to review the defects fort defect analysis and defect classification, in which both ebeam inspection tool and review SEM are yield management tools. The CD SEM is a metrology tool for measuring critical dimension of the semiconductor device.

The electron tip 110 in FIG. 1 can be cold-cathode emitter, thermionic emitter, or Schottky emitter, and Schottky emitter is preferred. The condenser lens 120 in FIG. 1 is an electrostatic lens, but it can be magnetic lens or EM compound lens. An e-gun system in SEM includes the electron tip 110, the anode 112, the electrode 114, the Coulomd plate 116, and the condenser lens 120.

A commercial objective lens for inspection is a SORIL system, which, compared to FIG. 1, further includes a scanning electrode above the deflector unit 150 for deflecting the primary electron beam into larger scanning field, and a swing electrode below the deflector unit 150 for swinging the magnetic objective lens. The SORIL system can provide large FOV (field of view) with large beam current. The detector 140 in FIG. 1 can be a semiconductor diode detector, PMT (Photomultiplier tube) detector, or MCP (Multi-Channel Plate) detector. Both the objective lens and the detector are the imaging system.

The stage, although not shown in FIG. 1, for supporting the specimen 10 may include x-y stage for moving the specimen in a horizontal motion, z-stage for moving the specimen in vertical motion, e-chuck for fastening the specimen, and a grounding system for grounding the specimen.

The ebeam tool in FIG. 1 must be operated in vacuum system and a chamber with pump for maintaining vacuum is necessary. The ebeam tool in FIG. 1 is thus inside the vacuum chamber. A load/lock is an interface for the specimen transferred between vacuum chamber and the atmosphere environment.

Before the specimen is transferred to the ebeam tool in FIG. 1, a FOUP (Front Opening Unified Pod) is necessary for receiving wafers stored in SMIF (Standard Mechanical InterFace) pod, and a robot will transfer the loaded wafer into the load/lock.

The SE and BSE, detected by the detector 140, will be sent out as signals to image-processing system. The SE signal can always provide topography information and VC while the BSE signal always provides material information.

A hardware control system directly controls the ebeam tool and the stage, and a software operating system for tuning inspection parameters via the hardware control system provides users to input recipe.

Charging accumulated on the specimen can be controlled by the electrode.

Defect can be identified by using random mode or array mode, and then all identified defect can be sent to review SEM to be analyzed and classified. Because the ebeam inspection tool has close resolution compared to review SEM, some defect classification can be conduct directly before review step.

Figure 2:
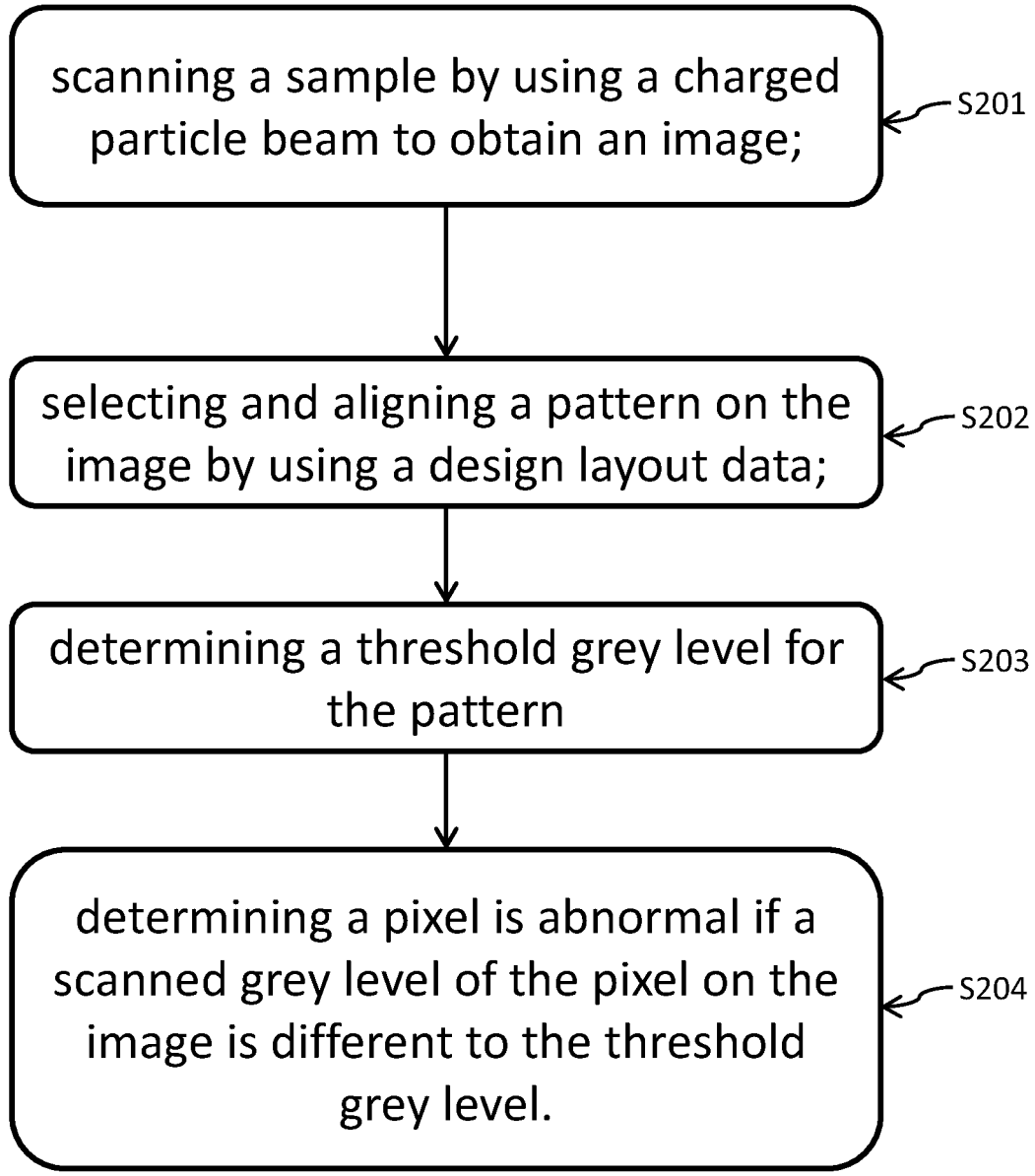
FIG. 2 is a flow chart for illustrating a method for inspecting pixel-level defect in accordance with one embodiment on the present invention.

Please refer to FIG. 2, a first embodiment of the present invention is provided. First, a step S201 of scanning a sample by using a charged particle beam to obtain an image is provided. The charged particle beam, in the present invention of a preferred embodiment, is an electron beam and operated by an ebeam inspection tool in FIG. 1. The scanning step requires a large beam current in order to gain high throughput. The term, "large", means several nA to pA in the inspection, compared to the beam current operated in review SEM or CD SEM.

Figure 4:
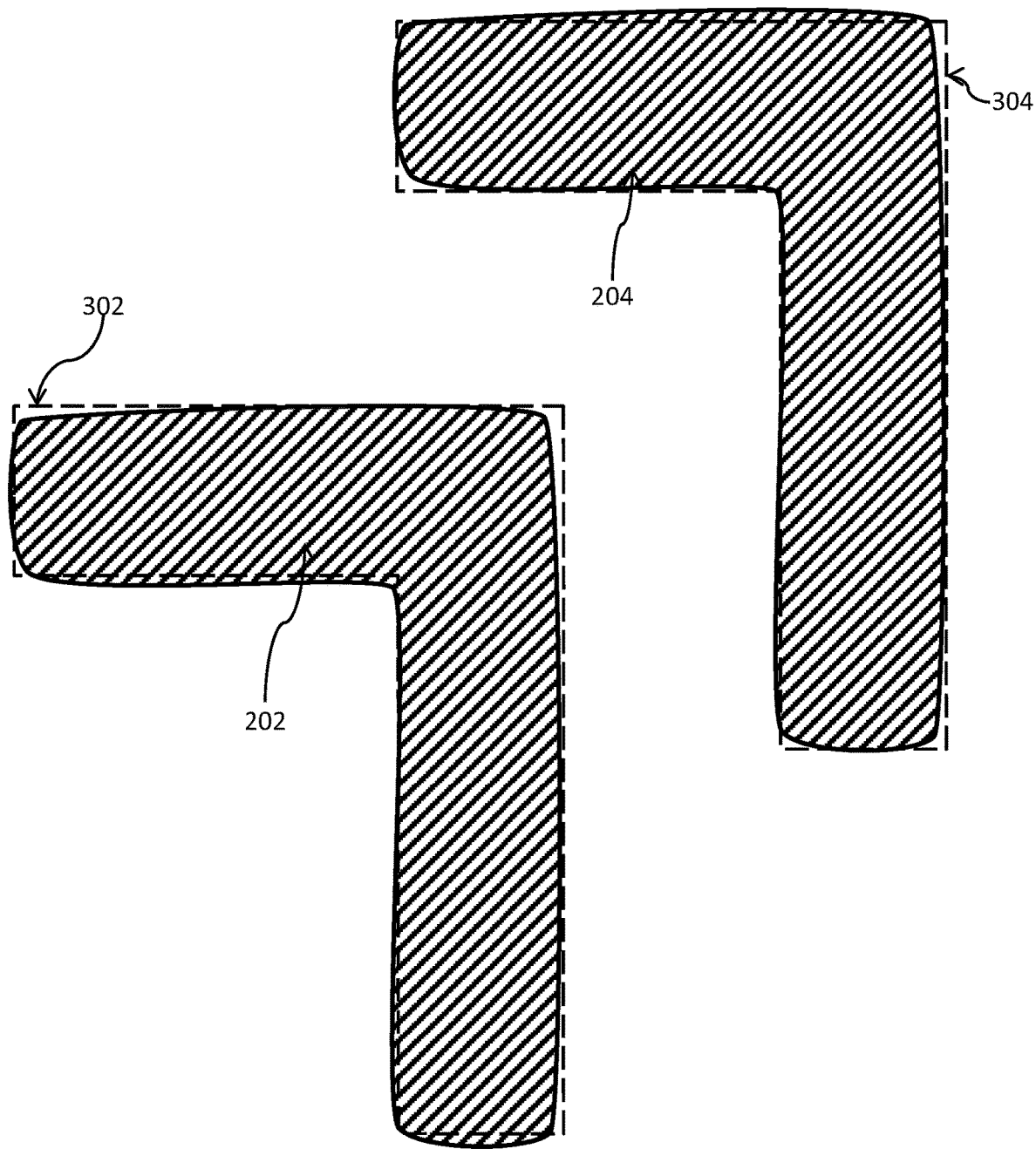
FIG. 4 is a schematic illustration of alignment between GDS information and scanned image pattern in accordance with one embodiment of the present invention.

Then, a step S202 of selecting and aligning a pattern on the image by using a design layout information is provided. In this step, the design layout information can be GDS (Graphic Database System), GDS II or OASIS(Open Artwork System Interchange Standard). Because patterns on the specimen are formed through several processes, such as lithography, etching and cleaning, there may be some distortions from the design layout information. Please refer to FIG. 4, two patterns 202 and 204 with hatch are selected and the dash lines 302 and 304 illustrate the design layout pattern on the design layout information. The alignment may need algorithm such that patterns 202 and 204 on the image can be matched to the design layout pattern 302 and 304 optimally.

Further, a step S203 of determining a threshold grey level for the pattern is provided. The determining step may need algorithm to determine a threshold grey level, such as averaging all grey level of the pixels on the pattern, middle grey level, or mode grey level. The threshold grey level may be a range which can be determined by any algorithm, such as any statistical method or prior experiences.

Next, a step S204 of determining a pixel is abnormal if a scanned grey level of the pixel on the image is different to the threshold grey level is provided. For the threshold grey level is a number, the grey level of the abnormal pixel must be different from the threshold grey level. If the threshold grey level is a range, the grey level of the abnormal pixel will exceeds this range.

Figure 5:
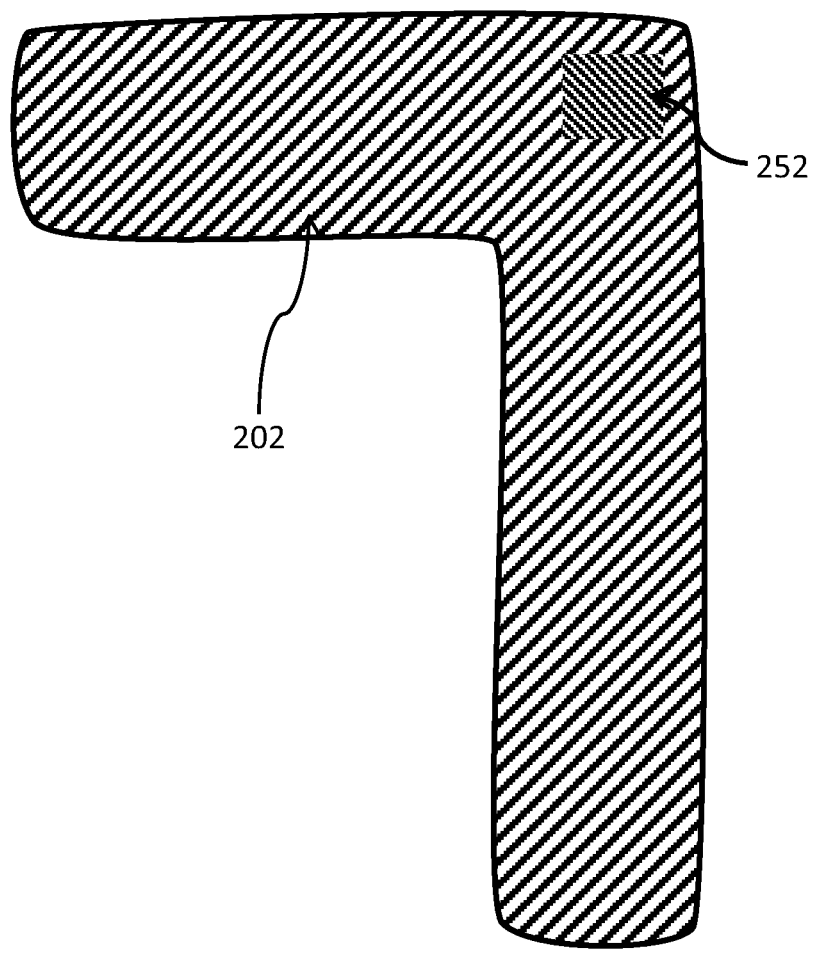
FIG. 5 is a schematic illustration of a pixel-level defect in accordance with one embodiment of the present invention.

Please refer to FIG. 5, the pixel 252 has a grey level different from all other grey level in the pattern and can be identified as defect. Thus, a pixel-level defect can be identified through inspection, especially VC mode inspection. Such pixel-level defect may be some kind of minor scratch, recession, protrusion, or particle. It could identify such kind of pixel-level defect because all pixel grey levels are within one pattern and a better uniform scanning environment and charging conditions can be provided. Hence, process uniformity of one pattern can be obtained also due to pixel-level defect distribution in one pattern.

Figure 3:
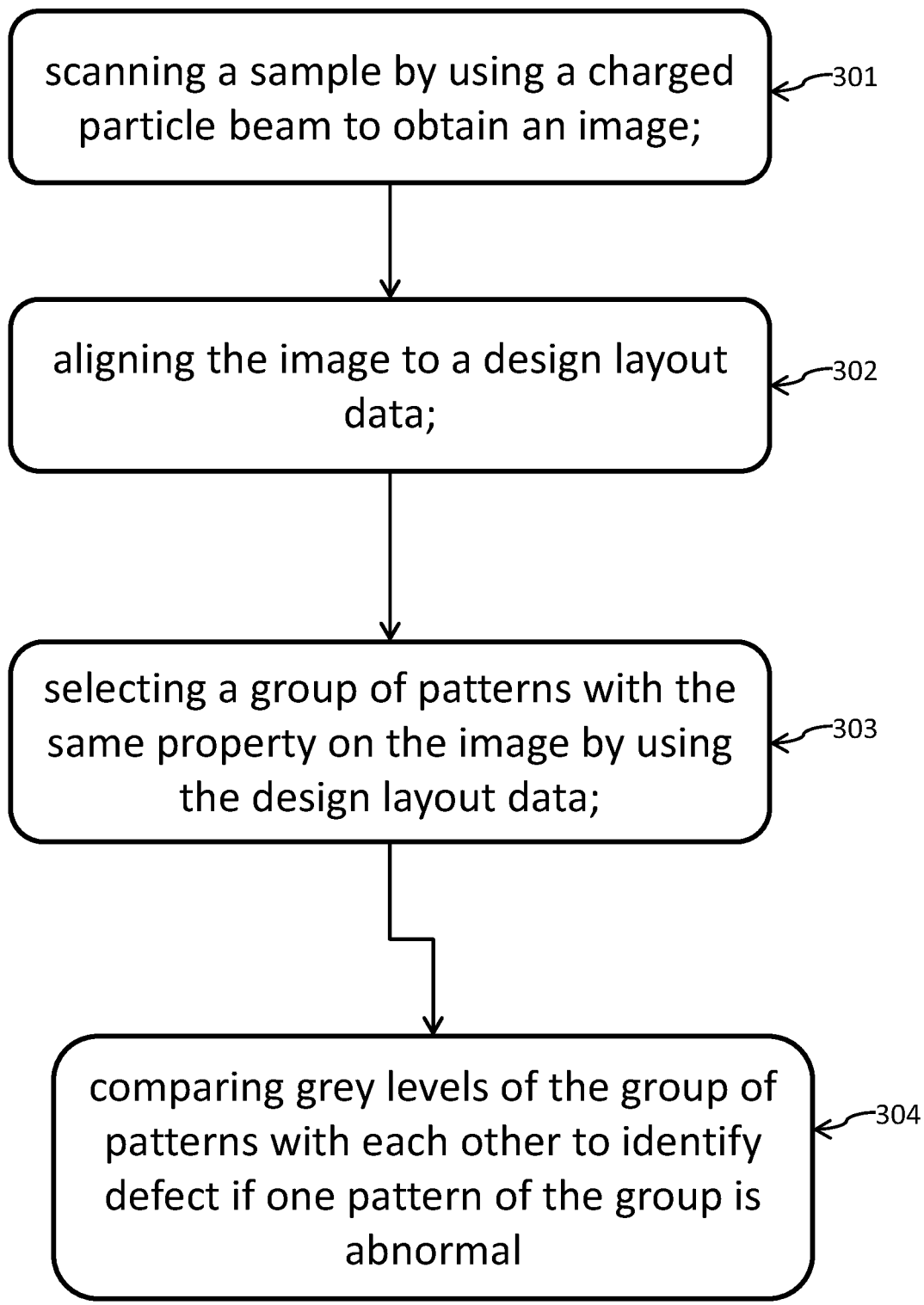
FIG. 3 is a flow chart for illustrating a method for inspecting VC defect of logic device in one image in accordance with one embodiment of the present invention.

Please refer to FIG. 3, a second embodiment of the present invention is provided. First, a step S301 of scanning a sample by using a charged particle beam to obtain an image is provided. This scanning step can be similar to the scanning step in the first embodiment in FIG. 2.

Then, a step S302 of aligning the image to a design layout information is provided. In this aligning step, all patterns on the image must be aligned to the design layout information. The design layout information can be GDS, GDS II or OASIS.

Figure 6:
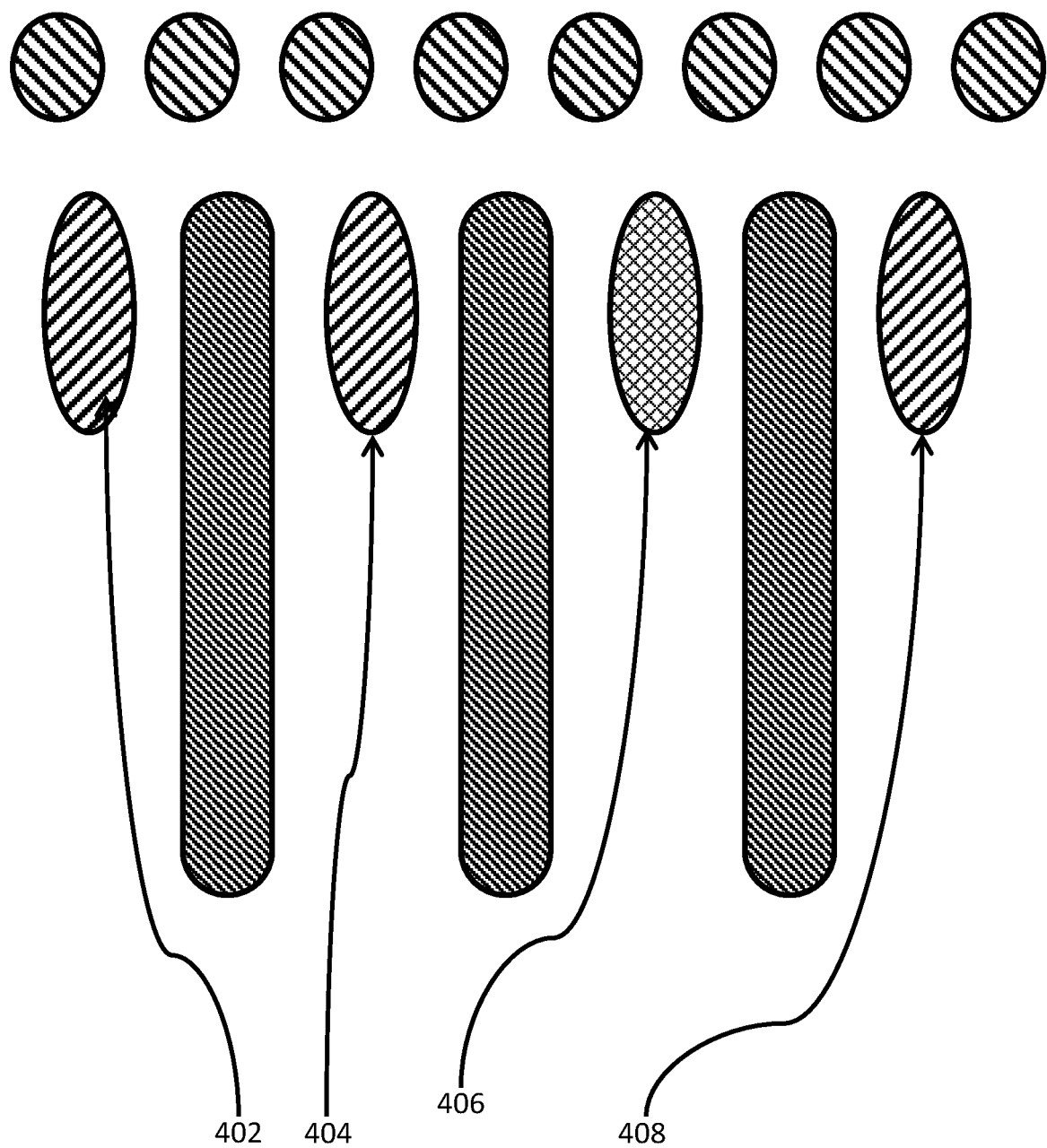
FIG. 6 is a schematic illustration of VC defect inspection in one image with one embodiment of the present invention.

Further, a step S303 of selecting a group of patterns with the same property on the image by using the design layout information is provided. In the selecting step, the same property can be the same shape, the same function, the same shape and function, or designated by users. Please refer to FIG. 6, a group of patterns 402, 404, 406, and 408 are selected because not only the patterns 402, 404, 406, and 408 have the same shape but also the patterns 402, 404, 406, and 408 are contact holes which connect to both p-well and n-well. Another example is to select the same shape and size contact holes which connect to n-well only. Still another example is to select the same shape size contacts holes which contact polysilicon gate only. Another example is to select the same shape and material contact, such as tungsten contact holes as one group and polysilicon contact holes as another group.

Next, a step S304 of comparing grey levels of the group of patterns with each other to identify defect if one pattern of the group is abnormal. Please refer to FIG. 6, a group of contact holes 402, 404, 406, and 408 are selected and each contact is compared with each other. If one contact 406 has different grey level, then the contact 406 can be identified defect. In this invention, this method can be applied to inspect logic circuit in one die only. Compared prior art, for logic circuit, only random mode can be applied to identify defect and thus yield of finding defects can't be compared to the array mode. By using this method of the invention, defect in the logic circuit can be identified in one die and yield of finding defect can be compared to the array mode.

Another advantage in the second embodiment is the process uniformity can be obtained. Because the group is determined according to the design layout information, which can be served as a base, the compare in the scanned image can reveal process uniformity. For example, if some contacts have larger dimension than others in one group, there must be some process recipe to be tuned to achieve that dimensions of all contacts in one group must be the same.

In summary, this invention provides an inspection method to identify defect by using design layout information. A threshold grey level of a selected pattern can be calculated, in which the selected pattern is aligned to the design layout information. The pixel-level abnormal or defect can be identified if the grey level of a pixel or several pixels is different from the threshold grey level. A group of patterns can be selected according to design layout information, and then grey level of the patterns in the group can be compared with each other to identify if one pattern is abnormal of defect.

Fast inspection advantage of VC mode can be provided and only one image is necessary for logic circuit device which prior art can't work. This invention further can provide one-pattern inspection; that means inspection abnormal or defect within one pattern only. Next, pixel-level abnormal or defect can be identified, that means ultrahigh resolution inspection can reach pixel-level, even one pixel. Although this inspection method is VC mode, which utilizes large beam current, not only circuit defect or electric defect can be identified according to prior VC defect detection, but also the process uniformity of one pattern or uniformity of one group of patterns can be identified or monitored.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An inspection method, comprising:
   scanning a sample with a charged particle beam to obtain an image comprising pixels with grey levels;
   aligning the image to design layout information to identify a homogeneous region of the image, the homogeneous region corresponding to an electrically homogeneous pattern on the sample;
   determining a threshold grey level for the identified homogeneous region according to grey levels of the identified homogeneous region; and
   determining a pixel of the identified homogeneous region corresponds to a defect on the sample in response to a grey level of the pixel being determined an outlier from the threshold grey level determined according to the grey levels of the identified homogeneous region.

2. The method according to claim 1, wherein the design layout information includes at least one of Graphic Database System (GDS), Graphic Database System II (GDS II), or Open Artwork System Interchange Standard (OASIS).

3. The method according to claim 1, wherein determining the threshold grey level for the identified homogeneous region according to the grey levels of the identified homogeneous region comprises:
   determining the threshold based on a statistical analysis of the grey levels of the identified homogeneous region.

4. The method according to claim 3, wherein the threshold grey level is at least one of an average grey level, a median grey level, a mode grey level, or a range of the grey levels of the identified pattern.

5. The method according to claim 1, wherein the defect is a voltage contrast defect.

6. The method according to claim 1, wherein the charged particle beam is an electron beam generated by a scanning electron microscope.

* * * * *